United States Patent [19]

Reese et al.

[11] 4,101,963
[45] Jul. 18, 1978

[54] WRISTWATCH CALCULATOR WITH INTERFACE CHIP

[75] Inventors: Robert O. Reese; Donald W. Garrison, both of Lancaster, Pa.

[73] Assignee: Time Computer, Inc., Lancaster, Pa.

[21] Appl. No.: 800,158

[22] Filed: May 25, 1977

[51] Int. Cl.² .................. G06F 7/38; G04B 37/12
[52] U.S. Cl. .............................. 364/705; 58/50 R; 58/152 R
[58] Field of Search ............. 235/152, 156; 58/50 R, 58/152 R; 340/335, 336; 315/149, 158; 364/705

[56] References Cited

U.S. PATENT DOCUMENTS

| | | | |
|---|---|---|---|
| 3,500,455 | 3/1970 | Ross et al. | 340/335 X |
| 3,928,960 | 12/1975 | Reese | 58/152 R |
| 3,955,355 | 5/1976 | Luce | 58/50 R |
| 3,962,600 | 6/1976 | Pittman | 315/158 |
| 4,047,010 | 9/1977 | Perotto et al. | 235/156 |

*Primary Examiner*—Jerry Smith
*Attorney, Agent, or Firm*—LeBlanc & Shur

[57] ABSTRACT

An improved wristwatch calculator has all of the active circuit elements contained on three chips mounted on the same substrate member in the watch case. A watch chip and a calculator chip each have their outputs connected to a single interface chip consisting of CMOS or I²L active elements which multiplex the watch and calculator chip outputs and select the appropriate display as a function of watch mode selection by pushbutton or inertia time demand switches or calculator mode selection by activation of the appropriate calculator keyboard switch on the watch face. The interface chip outputs are connected to six electro-optical display stations.

9 Claims, 16 Drawing Figures

WRISTWATCH CALCULATOR WITH INTERFACE CHIP

BACKGROUND OF THE INVENTION

This invention relates to a combination wristwatch and calculator and more particularly to a combination solid state wrist calculator and crystal controlled precision timepiece utilizing a common light emitting diode display. The time display and the calculator operations are mutually exclusive and are selected by a mode switch.

This invention constitutes an improvement on commonly assigned and co-pending U.S. patent application Ser. No. 740,409, filed Nov. 1, 1976, and entitled COMBINATION WRISTWATCH AND CALCULATOR and now abandoned. The disclosure of said U.S. patent application Ser. No. 740,409 is expressly incorporated herein in its entirety by reference thereto.

In recent years there have been developed a variety of new wristwatches generally referred to as "Electronic" watches. In many instances these devices use as a timing source a crystal controlled electronic oscillator whose frequency is divided to produce timing signals at a frequency of 1 Hz. and less by a low power solid state divider often incorporating complementary MOS transistors. A wristwatch of this general type incorporating light emitting diodes is disclosed in assignee's U.S. Pat. No. 3,803,827 and others. Through the use of large scale integrated circuits, it is possible to form most of the active components of the wristwatch from a single large scale integrated circuit chip or at the most only a few chips.

Recent years have also seen the development of a new family of electronic calculators generally referred to as pocket calculators. These calculators have taken a wide range of forms, depending upon size and complexity, but in many cases have incorporated integrated circuitry in combination with a digital numerical display. While in some instances the pocket calculators have been sufficiently small to be readily held in the palm of one hand, they have in all instances been quite large and bulky in relation to a modern sized man's wristwatch. One of the limiting factors in further reduction of size of a pocket calculator has been the necessity for a readily accessible keyboard which can be easily and accurately operated without placing undue requirements on the manual dexterity of the operator who performs the desired mathematical calculation.

In order to overcome these and other problems, there is disclosed in assignee's U.S. Pat. No. 3,803,834 a novel wristwatch device which combines the features of both a precision timepiece and a very small or miniature electronic calculator. This is made possible by combining in a novel manner certain features of the newer type wristwatches with certain features of the so-called pocket calculators and by providing an improved and unique miniature keyboard on the watch face.

In the device of that patent, time, which as used herein includes calendar information such as the day, month, and year, is constantly kept. This time information is displayed when desired on the face of the watch in the form of a digital numerical display. The display takes the form of an eight digit electro-optical display using two digits to display minutes, two digits for hours, two digits for the day of the month, and the last two digits for the month of the year.

By manually depressing a mode switch on the wristwatch, the calculator portion of the device is actuated and the eight digit display made responsive to the digital calculator circuitry. By depressing appropriate keys on the face of the wristwatch, the desired mathematical calculations are performed by the calculator circuits within the watch and the result displayed on the same digit display previously used to indicate time. Time is constantly being kept in the wristwatch even when operating in the calculate mode, so that accurate time may be displayed at any instant. In addition, when the device is used to display time, i.e., not in the calculate mode, the calculator circuits are de-energized so as to minimize the power drain on the small sized energy source or battery provided in the wristwatch case.

In assignee's U.S. Pat. No. 3,928,960 there is disclosed an improved device of this type particularly adapted for use with a light emitting diode display. In the disclosure of that patent, the display takes the form of seven display stations, four of which are used to display the same time (and calendar) information as in U.S. Pat. No. 3,803,834. Three of these stations along with the remaining three stations of the display are connected to a calculator circuit to form a six digit numerical calculator display.

SUMMARY OF THE INVENTION

The present invention is directed to an improved construction of this general type utilizing a common light emitting diode display and three large scale integrated circuit chips, namely a time and calendar chip (clock chip), a calculator chip, and a clock/calculator interface or control chip. An important feature of the invention resides in the fact that all three large scale integrated circuit chips are formed of complementary symmetry MOS transistors or bipolar logic to reduce power consumption from the wristwatch batteries. The only portions of the wristwatch which require a relatively higher current for operation are the LED display itself and the CMOS driver devices for the display, namely the segment drivers and digit drivers.

Physically, the wristwatch of this invention is constructed similarly to the device described and shown in detail in the afore-mentioned U.S. patent application Ser. No. 740,409. The principal difference lies in the electronic circuits provided on the electrically insulating substrate 42 (see FIGS. 2, 3 of Ser. No. 740,409). Additionally, the present invention incorporates an inertia switch, which, in a preferred embodiment, is also mounted on the member 42, whereby the wearer can activate the time display by a simple arm movement.

Additional differences include the fact that in the present invention, the calculator mode is engaged by depression of the "+" key, rather than the "0" key as in previous devices. In addition, the use of the interface chip in this invention effects a cost saving by replacing at least eight integrated circuits, reduces wire bonds by at least 20%, eliminates split keys and eliminates alignment problems. Furthermore, this invention incorporates a day of the week display in addition to the standard numerical hour, minutes, seconds, day and date displays.

DESCRIPTION OF THE PREFERRED EMBODIMENT

Figure 1A:
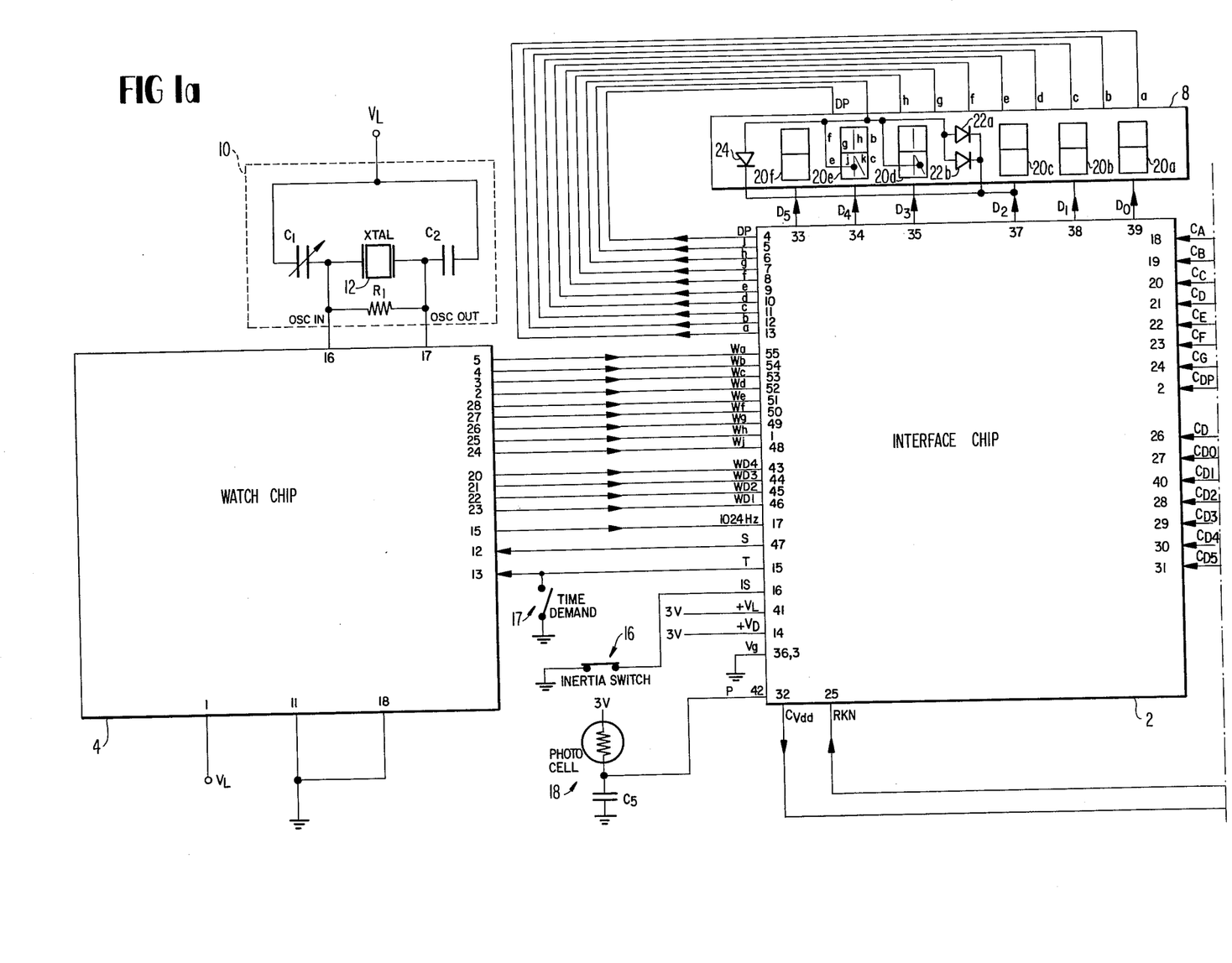
FIGS. 1a and 1b comprise a system block diagram.
Figure 1B:
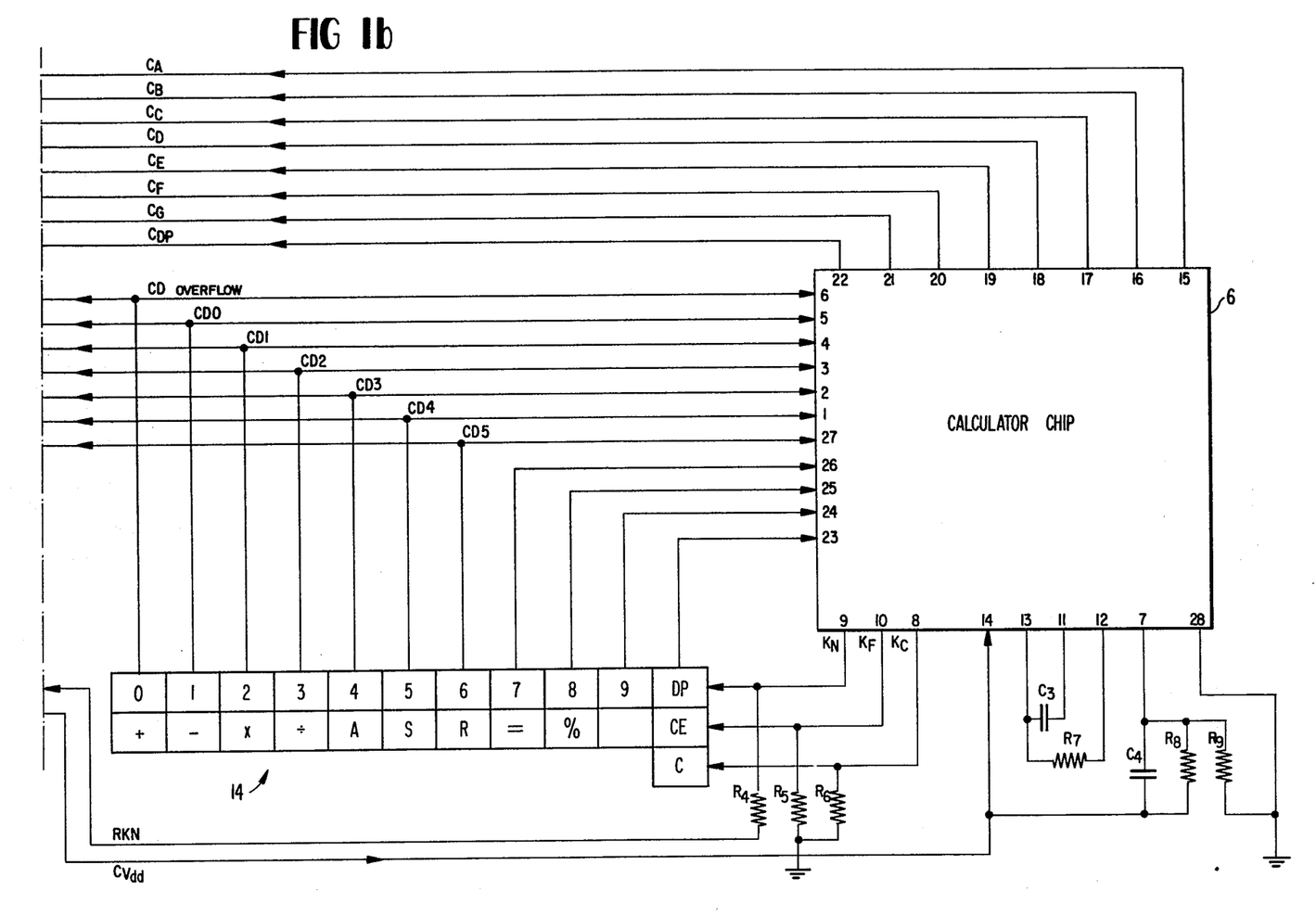

FIG. 1 is a block diagram showing the system of this invention. The watch calculator interface circuit 2 interfaces a watch circuit 4 with a calculator circuit 6 to control the supply of information to a special six digit LED display 8. It is contemplated that the watch circuit may comprise a Harris Semiconductor HD4822 CMOS integrated circuit; the calculator circuit may comprise a TOSHIBA T3338 CMOS integrated circuit. Each of these circuits supplies segment and digit information for seven and/or nine segment LED displays. The system operates from a 3.0 volt power supply consisting of four 1.5 volt watch batteries comprising two series connected pairs of 3.0 volts (nominal) each.

One pair of batteries powers the logic circuits of the watch, calculator and interface chips, through chip inputs $+V_L$ (logic). The other, parallel pair of batteries powers the segment and digit drivers, through chip input $+V_D$ (driver). By this arrangement, it is possible to replace the driver batteries, which are subject to greater power drain than the logic batteries, and therefore require more frequent changing, without disturbing the time keeping operation of the watch.

External to the clock chip 4 is an oscillator circuit 10 comprising a quartz crystal 12, a trimmer capacitor C1, an oscillator capacitor C2 and a resistor R1. The watch chip outputs include display information consisting of nine segment data lines Wa through Wj and four digit lines WD1 through WD4 which are supplied to corresponding inputs of the interface chip 2. The watch chip also supplies a 1024 Hz output signal to a corresponding interface chip input.

The calculator chip outputs include seven segment data lines Ca through Cg, a decimal point line CDP, six digit strobes CD0 through CD5, and an overflow flag CDOF; these calculator display information outputs are connected to appropriate inputs of the interface chip 2.

All of the inputs to the interface chip from the watch and calculator chips are CMOS level active inputs.

A keyboard 14, of the same type disclosed in co-pending application Ser. No. 740,409, is mounted on the face of the watch. Briefly, it comprises a plurality of keys which, when depressed, complete an electrical circuit to calculator chip 6 and/or interface chip 2. In addition to their standard function, the "+" and "S" keys serve to enter the calculating mode and provide a time setting function, respectively, as will be described in more detail below.

The upper row of keys of keyboard 14, containing number keys 0, 1, . . . , 9 and the decimal point key "DP", is connected through resistor R4 to interface chip output RKN. The purpose of this is to provide a positive inhibition of the calculator function during the watch mode of operation; output RKN is pulled to ground during the calculator mode operation, as described in more detail below.

Time display is commanded by an inertia switch 16 connected to an interface chip input IS or by a manually actuated time demand pushbutton 17. Inertia switch 16 is operated by a predetermined movement of the watch, e.g. by the wearer moving his arm in a certain pattern. Operation of pushbutton switch in a predetermined pattern produces a time or date display.

A brightness control circuit 18, comprising a photoresistive element PR in series with a capacitor C5 to form a variable time constant charging circuit, is connected to interface chip input P.

The display 8 comprises six display stations 20a–20f, a pair of centrally located light emitting diodes 22a, 22b for forming colon dots, and a negative/calculator overflow diode 24 shown at the leftmost side of the display 8. Since the calculator incorporates a floating decimal point, each of the six display stations is provided with a decimal point diode in a conventional manner. Digits 20a, 20b, 20c and 20f are seven segment displays; digits 20d and 20e are nine segment displays, connected as shown in FIG. 1, to form day-of-the-week indications (e.g. MO, TU, WE, TH, FR, SA, SU).

Six interface chip outputs D0–D5 are connected to the display 8 to control respective ones of display stations 20a–20f; interface chip output D2 controls the activation of digit 20c as well as colon dot diodes 22a, 22b and negative overflow indicator diode 24. Corresponding segments a–g and the decimal point DP of each display digit, and segments h of digits 20d and 20e are connected in common to corresponding interface chip outputs.

Figure 2:
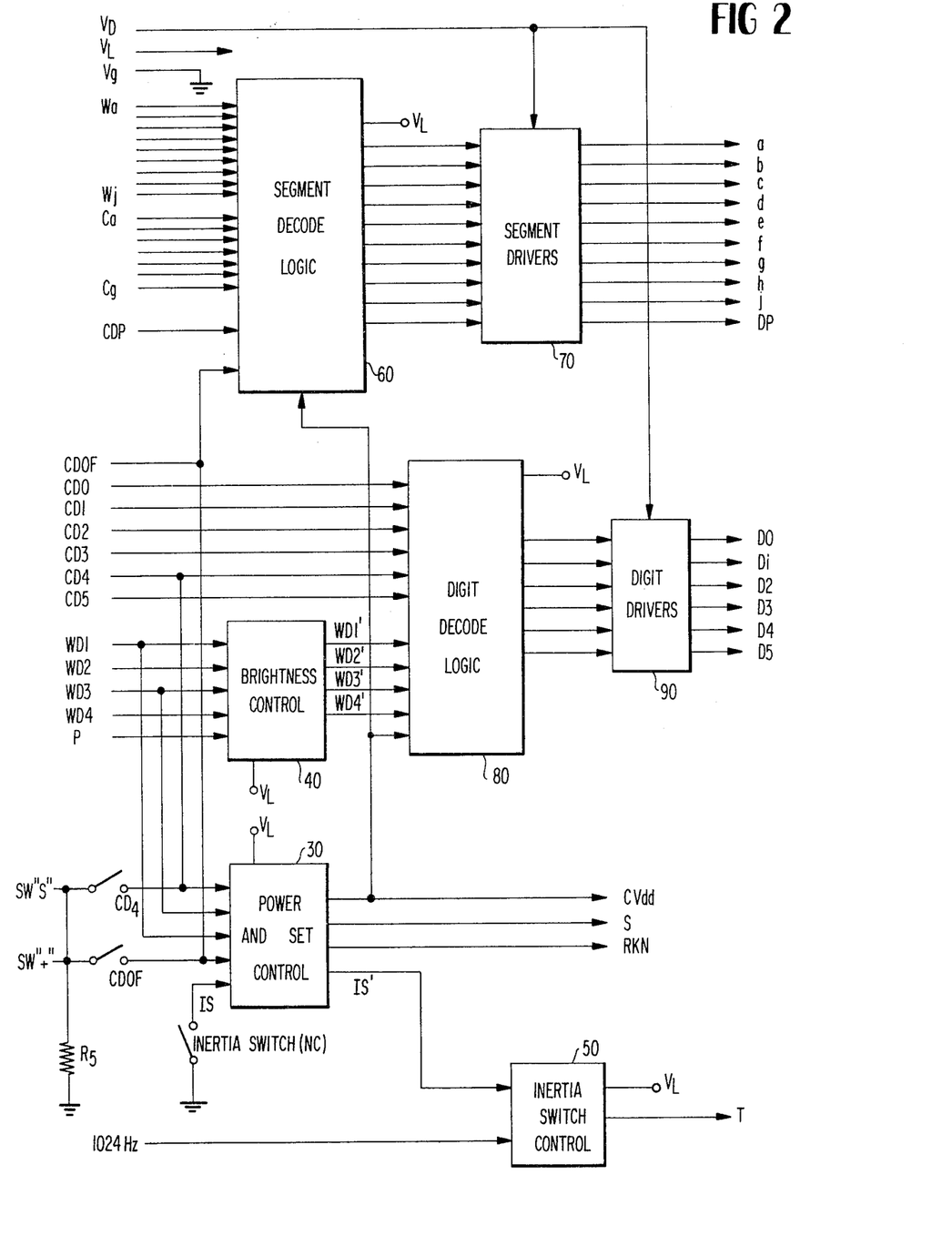
FIG. 2 is a block diagram of the interface chip.
Figure 2A:
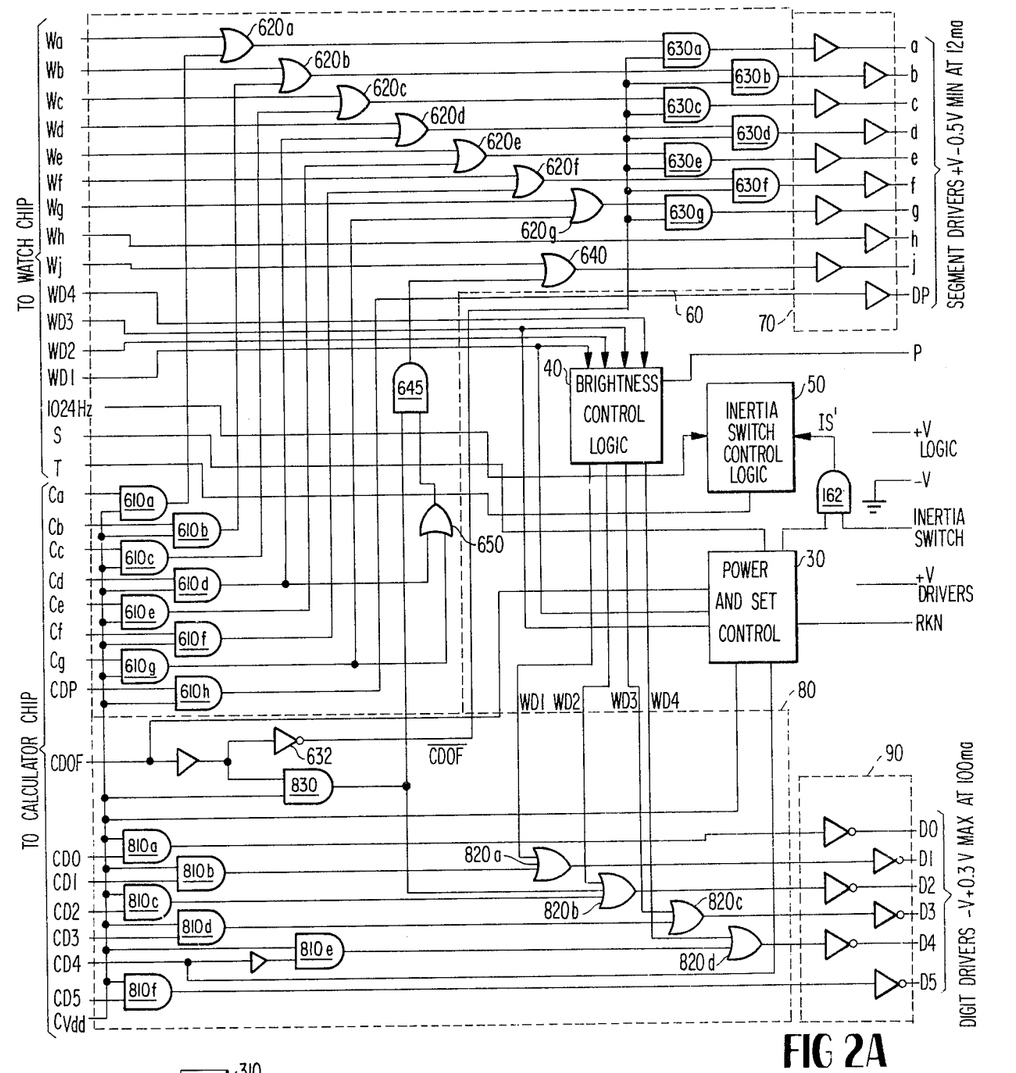
FIG. 2A is a schematic diagram of the interface chip.

FIG. 2 is a block diagram and FIG. 2A is a detailed circuit diagram of the interface chip circuits. The interface chip of this invention utilizes CMOS or I²L (Integrated Injection Logic) devices and combines on a single substrate a number of circuits which heretofore had been constructed as discrete units.

Figure 3:
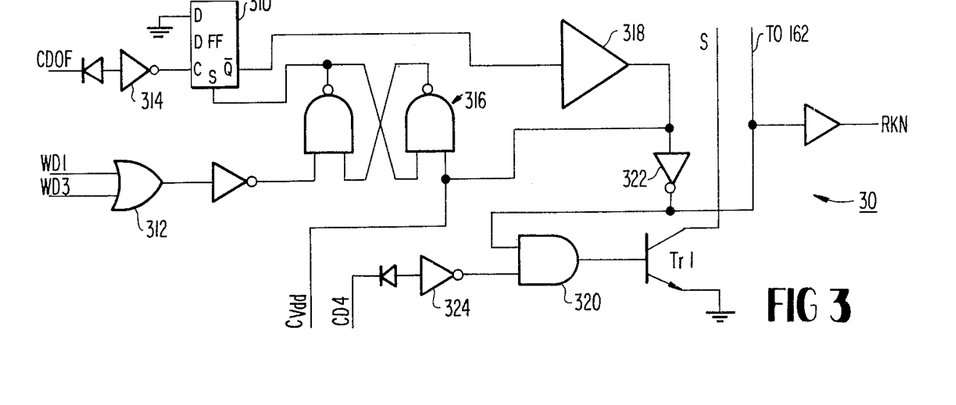
FIG. 3 is a schematic diagram of the power and set control logic.

Power and Set Control Logic 30 (FIG. 3)

The power and set control logic generates the calculator power-up signal CVdd (active high) and the watch setting signal S (active low). The CDOF input is connected through a diode to an inverter 314; the output of inverter 314 in turn is connected to the clock input of flip-flop 310. Except when switch SW "+" is depressed momentarily, input CDOF floats. When switch SW "+" is closed, the diode input to inverter 314 is pulled to ground to cause the inverter output to change state (from logic "0" to logic "1"). The inverter input is activated by an input level not to exceed 0.5 volts and deactivated by loading the input with an effective impedance of 250 KΩ.

Strobe inputs WD1 and WD3 are gated through an OR gate 312 and inverter to one input of cross-coupled NAND gates, generally designated 316, the output of which is connected to the set terminals of D flip-flop 310. A logic 1 on either WD3 or WD1, indicates that the watch circuit is active and time (watch mode) display has been demanded, either by the demand switch or by the inertia switch. This sets the output of cross-coupled NAND gates at a high level (logic 1) and prevents D flip-flop 310 from changing state in the subsequent presence of a clock input. Thus the calculator mode cannot be demanded as long as the device is in the watch mode. In the absence of WD1 and WD3 strobes, CVdd is energized by the momentary closure of normally open switch SW "+" which grounds interface chip input CDOF through resistor R$_5$ (FIG. 1). This produces a logic 1 at the clock input C of D flip-flop 310.

Absent an input from WD1 or WD3 (watch mode inactive), a logic 1 (output of inverter 314 high) appearing at the clock input of flip-flop 310 causes the Q output of flip-flop 310 to go high, thereby energizing CVdd through amplifier 318. Q remains high until an input appears on lines WD1 and/or WD3 (watch mode activated) to set D flip-flop 310 and return Q to zero.

The $\overline{Q}$ output of flip-flop 310 is also gated to transistor Tr1. A watch setting signal S (active low) is generated only during the watch mode operation. When the calculator mode is selected ($\overline{CDOF}$ high, $\overline{Q}$ high), triggering of transistor Tr1 is inhibited by AND gate 320. One input of gate 320 consists of the output of flip-flop 310 inverted by inverter 322. In the watch mode ($\overline{CDOF}$ low, $\overline{Q}$ low), time setting is selected by momentarily closing switch SW "S", which grounds interface chip input CD4 through resistor R5. This input signal is inverted by inverter 324 (operated in the same manner as inverter 314) and gated through gate 320 to trigger transistor Tr1 conductive and pull output S to ground.

The output of inverter 322 is also connected to terminal RKN and to inertia switch control gate 162. The output of AND gate 162 is connected to and controls the inertia switch logic 50. When the calculator mode is selected, output $\overline{Q}$ of flip-flop 310 goes high and output signal RKN is pulled low (to ground) to enable calculator keyboard switches "0", "1", ..., "9" and "DP". When $\overline{Q}$ goes high, the input to gate 162 goes low (logic 0). AND gate 162 is thus disabled to inhibit the operation of the inertia switch during the calculator mode.

Brightness Control Logic 40 (FIGS. 4, 4A–4C)

Figure 4:
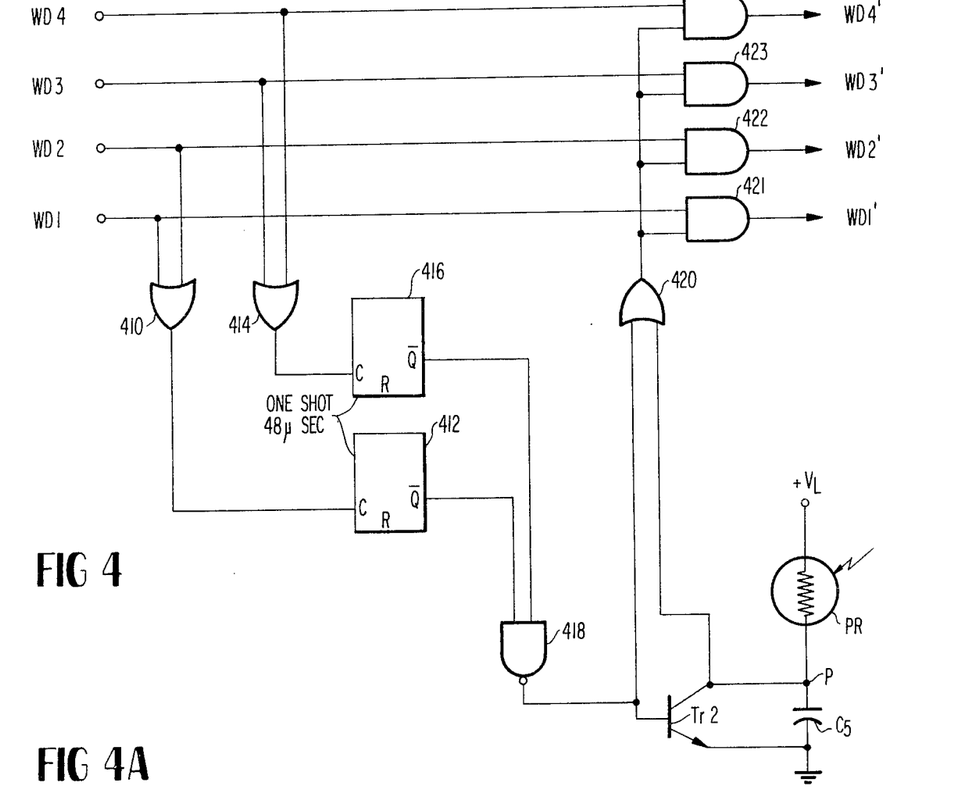
FIG. 4 is a schematic diagram of the brightness control logic.
Figure 4A:
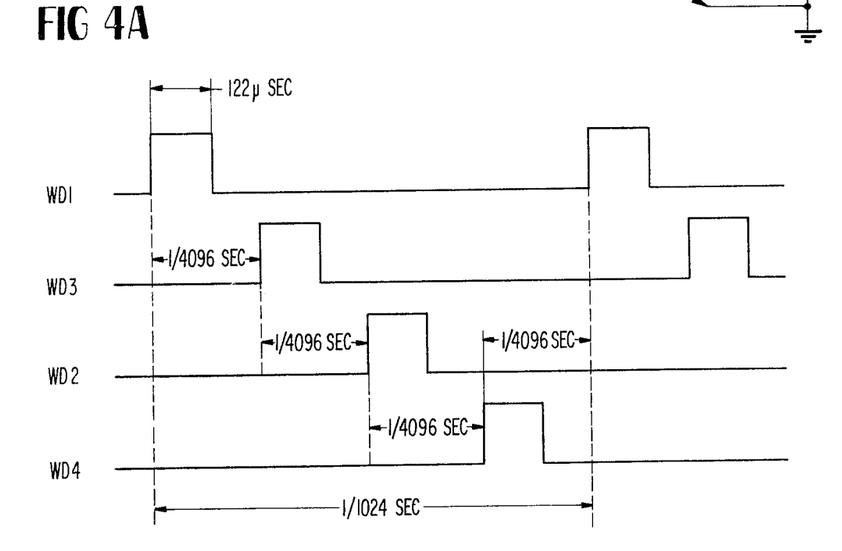
FIGS. 4A–C are waveform/timing diagrams for the brightness control logic.

In the watch mode, the display is controlled as a function of watch digit inputs WD1–WD4. These are strobed signals having a repetition rate of 1024 Hz and a period of approximately 122 μsec. (1/8192 second). FIG. 4A shows the phase relationship among watch digit input strobes WD1 through WD4.

The brightness control logic generates variable pulse width strobes WD1'–WD4' in response to watch digit input strobes WD1–WD4. The pulse width of strobes WD1'–WD4' is varied as a function of the ambient light illuminating a photoresistive element PR. In the brightness control logic circuit, watch digit inputs WD1 and WD2 are gated through an OR gate 410 to the clock input of a monostable multivibrator 412, having a typical nominal pulse width of 48 μsec. Watch digit input strobes WD3 and WD4 are gated through an OR gate 414 to the clock input of a second monostable 416, also having a 48 μsec nominal pulse width. The Q outputs of monostables 412 and 416 are applied to respective inputs of NAND gate 418, the output of which is connected in common to one input of an OR gate 420 and the base of a switching transistor Tr2, the emitter of which is grounded. The collector of transistor Tr2 is connected in common to the second input of OR gate 420 and to output point P of the photo-resistive time constant circuit comprising photo-resistor PR and capacitor C5. The output of OR gate 420 is connected in common to one input of each of AND gates 421, 422, 423, and 424. Watch digit input strobes WD1 through WD4 are applied as the second inputs of AND gates 421–424, respectively.

The appearance of any one of watch digit inputs WD1–WD4 triggers one or the other of monostables 412 and 416. Referring to FIG. 4C, which shows a timing diagram of the operation of the brightness control circuit triggered by the appearance of watch digit input WD1, monostable 412 is triggered at time $t_1$ by watch digit strobe WD1 to cause its $\overline{Q}$ output to become low for its 48 μsec ON-time. The output of NAND gate 418 becomes high (logic 1) for this 48 μsec period, thereby triggering transistor Tr2 into its ON or conductive state. At the same time, the output of NAND gate 418 is gated through OR gate 420 to the commonly connected inputs of gates 421–424. Watch digit input WD1 is therefore gated through gate 421 for the ON period of monostable 412. During the ON-time of transistor Tr2 point P is held substantially at ground.

At time $t_2$, monostable 412 returns to its stable or OFF state and the $\overline{Q}$ output goes high; the output of NAND gate 418 becomes low and transistor Tr2 switches to its OFF or nonconductive state. Immediately after time $t_2$, both inputs of OR gate 420 are low; the output WD1' of AND gate 421 thus becomes low. The voltage at point P begins to increase at a rate determined by the time constant of the charging network 18. The increase in voltage at P is gated through gate 420 to gate 421. The resistance of element PR is inversely related to the amount of ambient illumination; thus, the lower the light level, the higher the resistance of element PR and the longer it takes to charge capacitor C5. The voltage at the input of the AND gate 421 (and therefore the voltage at point P) must reach a certain level before the AND gate will turn ON and pass input WD1. This occurs at time $t_3$, which is variable with respect to $t_2$ and depends on ambient light conditions.

Figure 4B:
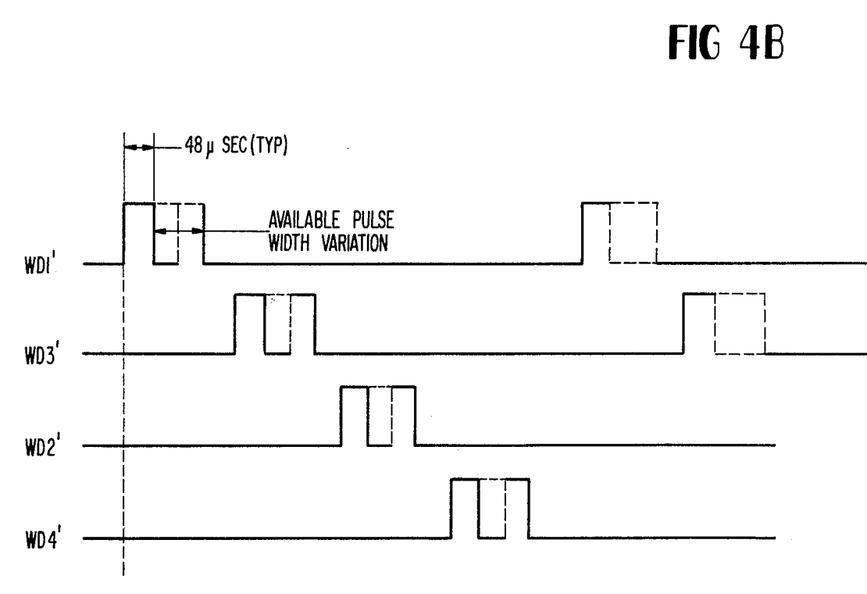
Figure 4C:
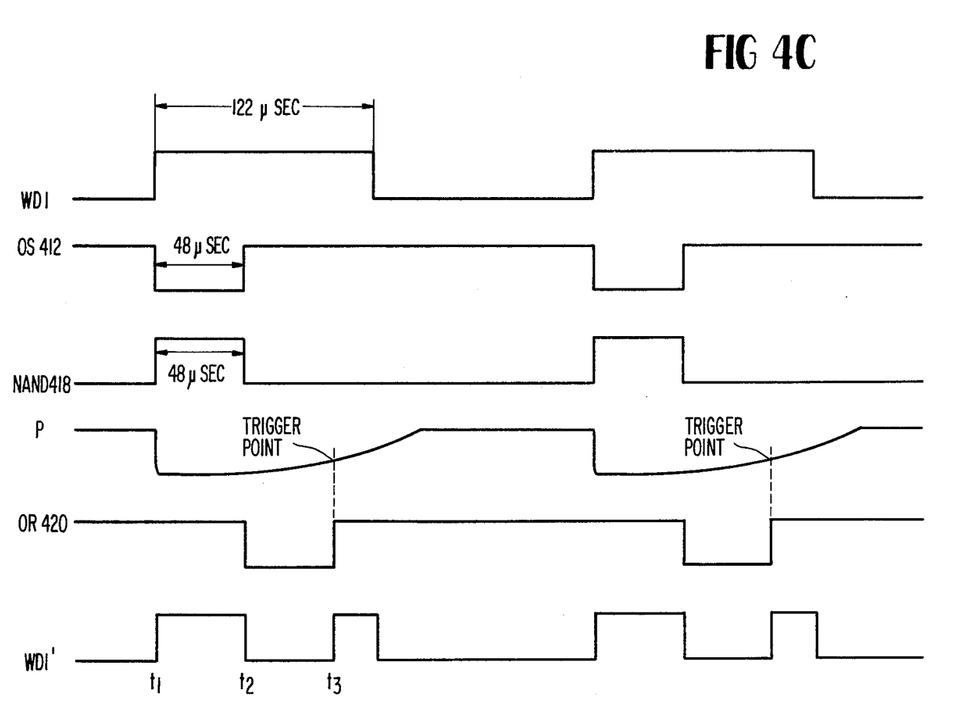

From FIG. 4B it will be seen that the strobe WD1' has a minimum pulse width determined by the 48 μsec nominal monostable multivibrators 412 and 416, and a maximum pulse width (122 μsec) determined by the periodicity of the watch digit input WD1; the variation between the two limits is determined by the time constant of the externally connected charging circuit 18.

Inertia Switch Control Logic 50 (FIGS. 5, 5A–C)

Figure 5:
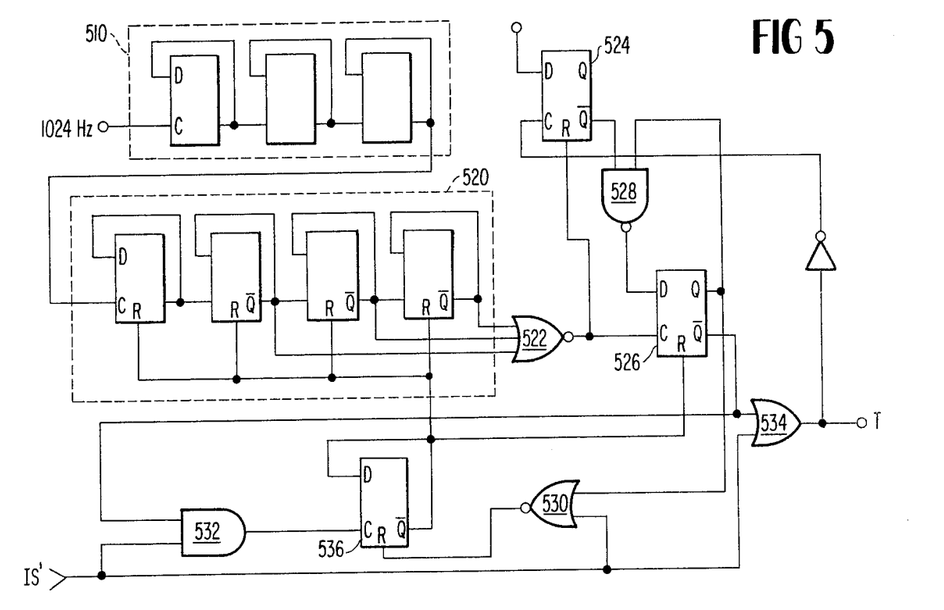
FIG. 5 is a schematic of the inertia switch control logic.

The inertia switch control logic 50 generates a time window in response to the externally connected, normally closed inertia switch 16 (input IS). A reference time window is generated by the opening of the switch 16 to begin counting at a 128 Hz rate. The window opening occurs (nominally) 105 ms after switch opening and the window closing occurs (nominally) 230 ms after switch opening. If the switch closure occurs within the generated time window, then a valid time request is asserted by the logic and output T is held low for a preset time after the switch 16 is closed. If the switch closure occurs before the window opening (less than 105 ms) the switch input is used to reset the logic to its initialized state. If the switch closure occurs after the window closes (greater than 230 ms), the logic resets itself to its initialized state.

The inertia switch itself may comprise an evacuated glass tube or envelope which, if desired, may be backfilled with an inert gas to control the mechanical viscosity and containing a small amount of conductive material which is fluid at ambient temperatures (e.g. mercury). Projecting into one end of the tube are a pair of electrical contacts, one of which is connected to the negative side of the logic power supply ($V_g$) and the other of which is connected through the inertia switch input IS of the interface chip to one input of the inertia switch control gate 162; the other input of control gate 162 constitutes the inverted $\overline{Q}$ output of power and set control flip-flop 310. In operation, a quick movement of the arm of the wearer in the appropriate direction causes the mercury drop in the glass tube to move from the normal rest, or closed position, electrically connecting the pair of contacts, to an open position. Thus, the inertia switch constitutes a normally closed switch that, when opened, permits the inverted $\overline{Q}$ output of flip-flop 310 to be gated through gate 162 to enable the inertia switch logic to generate the time window.

The inertia switch control logic provides a means for preventing inadvertent operation of the time display upon opening of the inertia switch due to movement of the wearer's arm not in accord with the predetermined required movement for operating the display. To prevent such inadvertent operation, the wearer must move the watch in such a manner as to cause the inertia switch to open and then close within a predetermined time period, i.e. within the generated time window.

More particularly, a 1024 Hz clock obtained from an intermediate tap of the main frequency divider on clock chip 4, provides a clock input for the inertia switch control logic. This 1024 Hz signal is divided down to 128 Hz by a three-stage counter 510.

The 128 Hz clock signal output of counter 510 is applied to the input of a four-stage counter 520. Counter 520 is normally inhibited by a flip-flop 536 from counting down the 128 Hz output from counter 510. Upon movement of the wearer's arm to open the inertia switch, the output of an AND gate 532 goes high and the $\overline{Q}$ output of flip-flop 536 goes low to permit counter 520 to begin counting down the 128 Hz output from counter 510. A NOR gate 522 detects the occurrence of the fourteenth 128 Hz. pulse to generate a time window opening signal. The output of NOR gate 522 is connected to the R (reset) input of D flip-flop 524 and the C input of D flip-flop 526. The D input of flip-flop 524 is connected to $V_L$ and the $\overline{Q}$ output is connected to one input of a NAND gate 528. The Q output of flip-flop 526 is connected to the second input of NAND gate 528 and to one input of a NOR gate 530. The $\overline{Q}$ output of flip-flop 526 is connected to one input of AND gate 532 and to one input of an OR gate 534. The second inputs of gates 530, 532 and 534 are coupled in common to input IS' (output of gate 162).

The output of gate 532 is connected to the C input of D flip-flop 536; the output of gate 530 is connected to the R input of flip-flop 536. The $\overline{Q}$ output of flip-flop 536 is connected in common to the reset inputs of counter 520 and flip-flop 526 and is fed back to the D input of flip-flop 536. The inverted output of OR gate 534 is connected to the C input of flip-flop 524.

On the occurrence of the fourteenth 128 Hz signal, gate 522 clocks flip-flop 526 and resets flip-flop 524. Time window opening thus occurs on the fourteenth 128 Hz pulse (nominally 105 ms after switch opening) and window closing occurs on the thirtieth 128 Hz pulse (nominally 230 ms after switch opening).

Figure 5A:
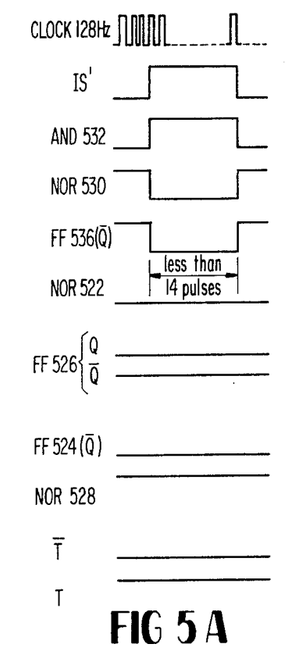
FIGS. 5A–C are waveform/timing diagrams for the inertia switch control logic.

If switch closure occurs before the appearance of the fourteenth 128 Hz signal, flip-flop 536 is reset by inertia switch input signal IS' through gate 530; this resets the inertia switch control logic 50 to its initialized state (i.e., counter 520 is reset to zero and is inhibited from counting the 128 Hz input signal). FIG. 5A.

Figure 5B:
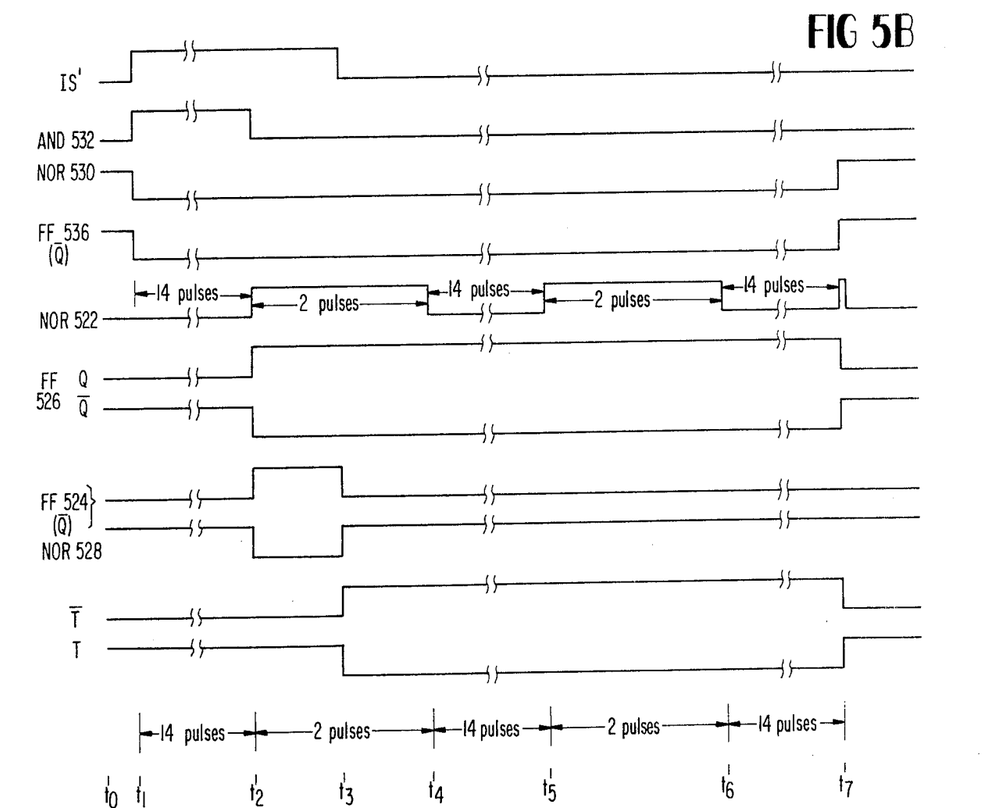

If switch closure occurs within the generated time window (i.e., between the fourteenth and thirtieth 128 Hz pulses), a valid time request is asserted by the switch control logic and output T is held low from the time the switch is closed until the occurrence of the forty-sixth 128 Hz pulse (nominally 355 ms). FIG. 5B.

Figure 5C:
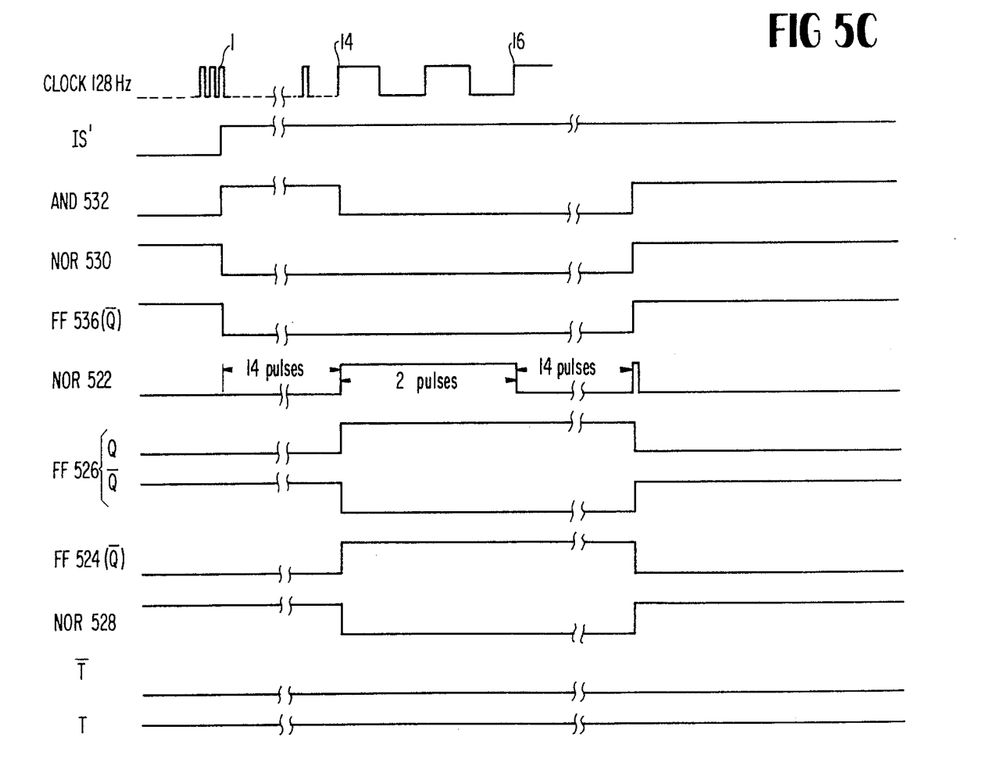

If the switch closure occurs after the time window closes (greater than 230 ms), the thirtieth 128 Hz pulse resets and inhibits counter 520 and resets the output logic to its initialized state (T goes high). FIG. 5C.

Segment Decode Logic 60 (FIG. 2A)

The segment decode logic receives segment information from the watch circuit inputs Wa through Wj and the calculator inputs Ca through Cg, and CDP. The calculator power-up signal CVdd and input CDOF are used to gate the proper set of display information to the segment driver section.

The segment decode logic includes a first set of AND gates 610, each having a common input CVdd obtained from the output of power and set control logic 30. A second input of each of gates 610 is connected to respective calculator chip outputs Ca-Cg. The outputs of gates 610 are connected to respective inputs of OR gates 620; the second inputs of OR gates 620 are connected respectively to watch chip outputs Wa-Wg. The outputs of gates 620 in turn are connected to respective inputs of AND gates 630; the second inputs of gates 630 are connected in common through an inverter 632 to the CDOF interface chip input.

In the watch mode, input CDOF floats and $\overline{\text{CDOF}}$ is high. Thus, watch digit segments Wa-Wg are gated through OR gates 620 and AND gates 630 to activate the desired display segments. Watch segment input Wh is activated only in the time display mode, and particularly when the alphabetic day of the week display is commanded by the time demand switch 17 through watch chip 4. Watch segment Wh also controls the operation of the colon dots 22, which operate only during the time display mode. Thus, a direct path is provided through the interface chip to the segment driver section for watch display input Wh.

Watch display segment signal Wj is operated during the watch display mode to activate the appropriate segments when the day of the week display is commanded. Signal Wj is connected to one input of an OR gate 640. The other input of OR gate 640 is connected to the output of an AND gate 645. This AND gate has two inputs, one controlled by an overflow indication on input CDOF during the calculator mode and the other connected to the output of an OR gate 650, the inputs of which are connected to the outputs of gates 610d and 610g. During the watch display mode, input Wj passes through OR gate 640 to activate day of the week segments. In the calculator mode, a signal appears at the output of gate 640 to activate diode 24 when an overflow condition obtains in the calculator circuit.

As noted above, in the watch mode, $\overline{\text{CDOF}}$ is normally maintained at a high level to permit watch segment inputs Wa-Wg to be gated directly through gates 630 to the segments drivers. After the device has been placed in the calculator mode, by the momentary depression of switch SW "+", $\overline{\text{CDOF}}$ is again maintained at a high level to permit calculator segment inputs Ca-Cg to be gated directly through gates 630 to the segment drivers.

When an overflow condition occurs in the calculator mode, as when the number to be displayed contains more than six digits, a logic high level will appear at the CDOF interface chip input. This logic high level is inverted in inverter 632 to a logic low level; this inhibits the transmission of calculator segment signals Ca-Cg through gates 620 during the overflow condition.

The Boolean expressions for the segment display information are as follows:

$$a = Wa \cdot \overline{CVdd} + CVdd \cdot Ca \cdot \overline{CDOF}$$

$$b = Wb \cdot \overline{CVdd} + CVdd \cdot Cb \cdot \overline{CDOF}$$

$$c = Wc \cdot \overline{CVdd} + CVdd \cdot Cc \cdot \overline{CDOF}$$

$$d = Wd \cdot \overline{CVdd} + CVdd \cdot Cd \cdot \overline{CDOF}$$

$$e = We \cdot \overline{CVdd} + CVdd \cdot Ce \cdot \overline{CDOF}$$

$$f = Wf \cdot \overline{CVdd} + CVdd \cdot Cf \cdot \overline{CDOF}$$

$$g = Wg \cdot \overline{CVdd} + CVdd \cdot Cg \cdot \overline{CDOF}$$

$$h = Wh$$

$$j = Wj + CVdd \cdot CDOF (Cg + Cd)$$

$$DP = CDP \cdot CVdd$$

Figure 6:
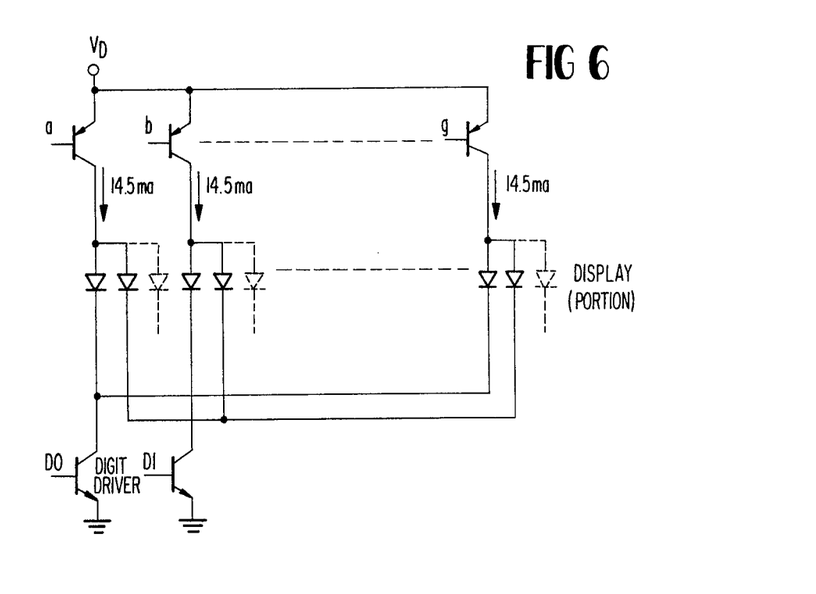
FIG. 6 is a schematic of the segment/digit driver circuit.

Segment Drivers 70 (FIG. 6)

The segment driver section accepts the segment decode signals and provides a nominal 12 ma current source (pnp type) drive from 3.0 volts for a common cathode LED seven or nine segment plus decimal point display.

Digit Decode Logic 80 (FIG. 2A)

The digit decode logic receives digit information from the calculator chip 6 (inputs CD0 through CD5, CDOF), and from the brightness control logic 40 (signals WD1' through WD4'). The calculator power-up signal CVdd from power and set control logic 30 and the input CDOF are used to enable the proper set of digit information to the digit driver section 80.

The digit decode logic includes a group of AND gates 810, each having one input connected in common to the CVdd output of the power and set control logic 30. A second input of each AND gate 810 is connected respectively to calculator digit outputs CD0-CD5. The outputs of AND gates 810a and 810f are connected directly to the appropriate digit drivers 90. The outputs of gates 810b, 810c, 810d and 810e are gated through OR gates 820 along with watch digit display signals WD1' through WD4' from brightness control logic 40. The outputs of gates 820 are connected to the appropriate digit driver 90.

OR gate 820b has a third input derived from the output of an AND gate 830, also having one input connected to the CVdd line and a second input connected to CDOF. A level high signal appears in the output of gates 830 only during the calculate mode (CVdd high) when an overflow signal is detected (CDOF high) to drive overflow indicator diode 24 through digit display input D2 and segment display input j.

The Boolean expressions for the digit display information are as follows:

$$D0 = \overline{(CD0 \cdot CVdd)}$$

$$D1 = \overline{(CD1 \cdot CVdd)} + WD1'$$

$$D2 = \overline{(CD2 + CDOF) CVdd} + WD2'$$

$$D3 = \overline{(CD3 \cdot CVdd)} + WD3'$$

$$D4 = \overline{(CD4 \cdot CVdd)} + WD4'$$

$$D5 = \overline{(CD5 \cdot CVdd)}$$

Digit Driver 90 (FIG. 6)

The digit driver section accepts the digit decode logic output signals and provides a nominal 100 ma current sink (npn type) to ground for a common cathode LED seven or nine segment display.

Figure 7:
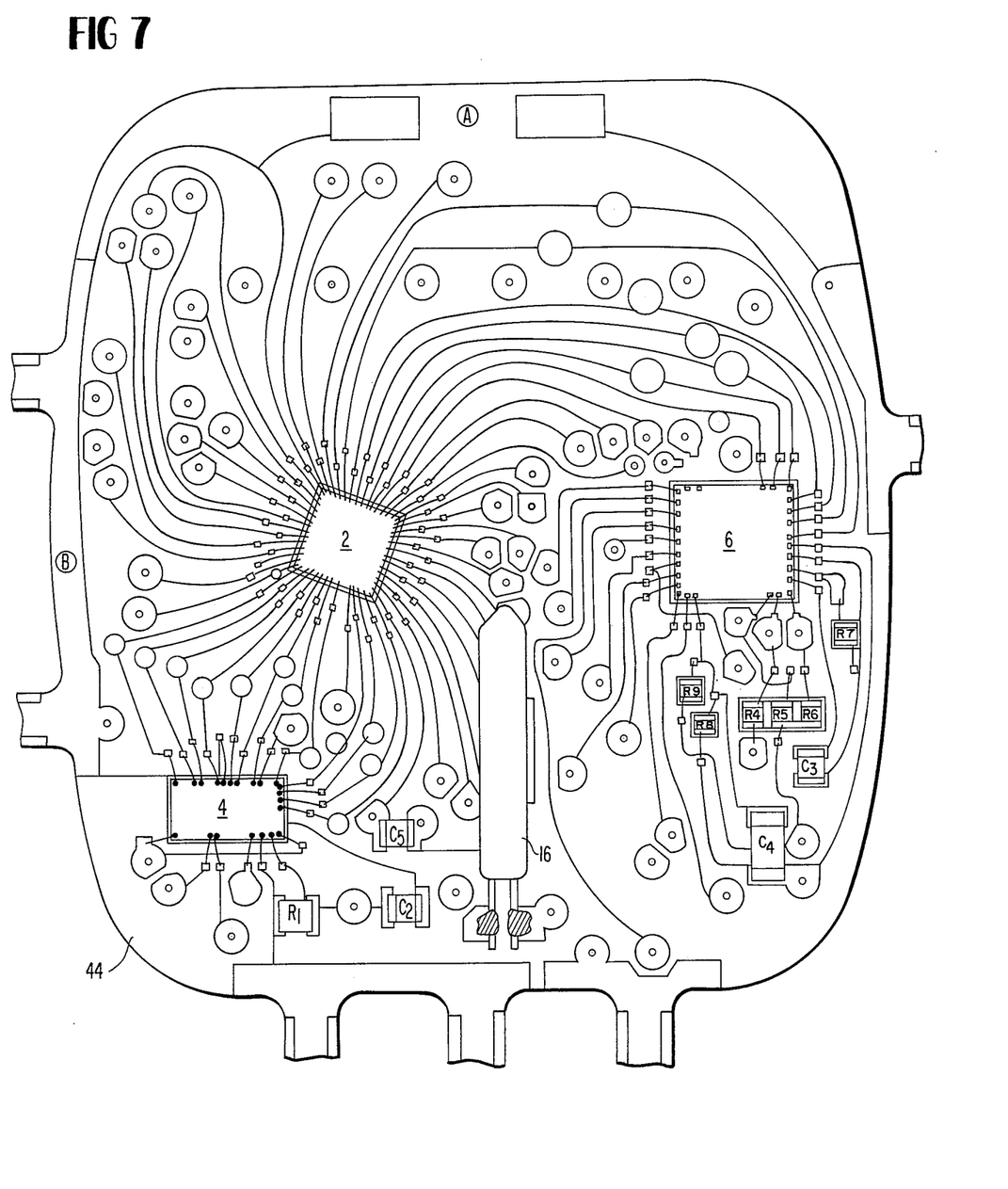
FIG. 7 is a substrate assembly diagram showing the mounting of the clock chip, calculator chip, and interface chip.
Figure 8:
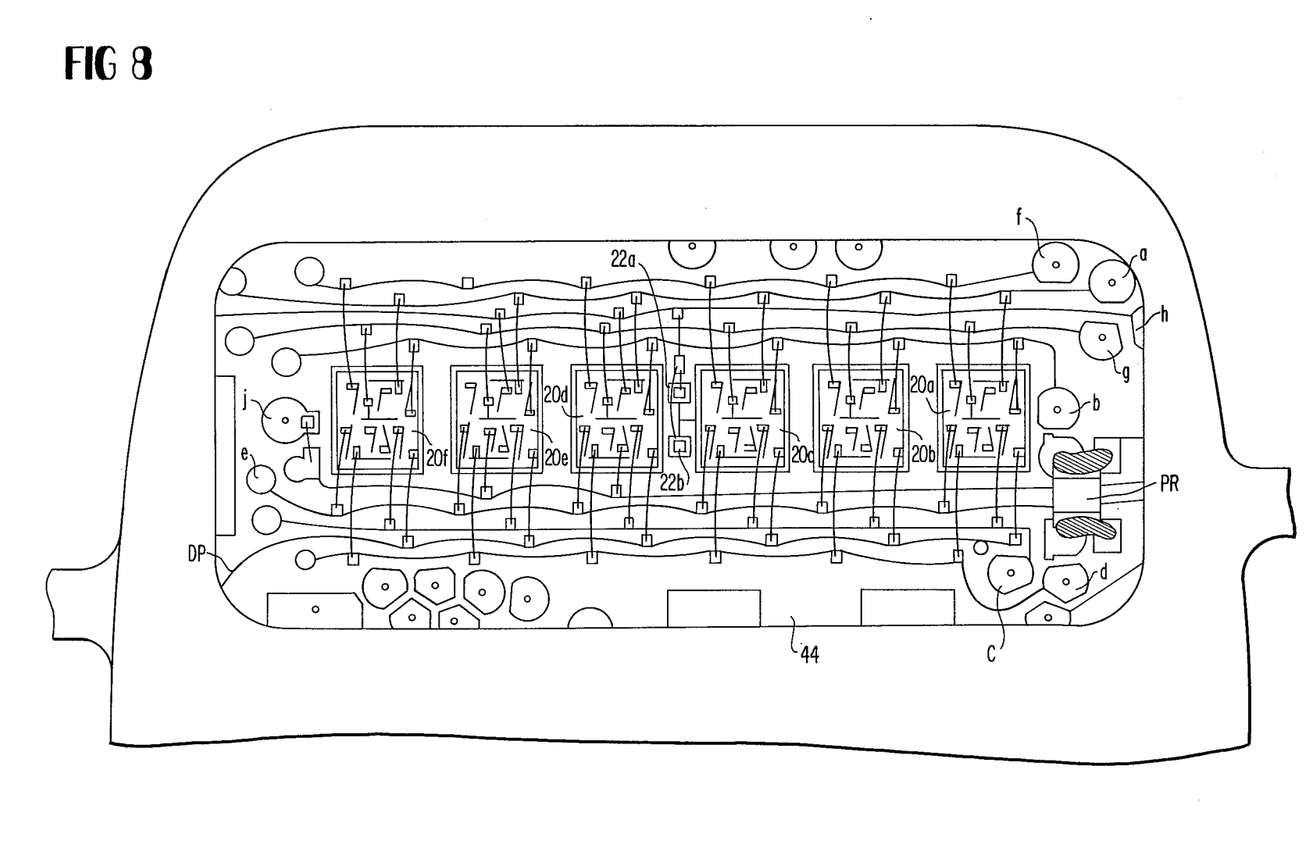
FIG. 8 shows the opposite side of the substrate from FIG. 7 with the display station mounting.

Substrate Assembly (FIGS. 7, 8)

The clock chip 4, calculator chip 6 and interface chip 2, along with resistors $R_1$ and $R_4$-$R_9$, and capacitors $C_2$-$C_5$ are mounted on one side of a substrate 44 (FIG. 7). Inertia switch 16 is bonded to the same side of substrate 44 as the several chips. The six LED display stations 20a-20f, colon dots 22a, 22b, overflow/negative indicator 24 and photocell PR are mounted on the other side of the substrate 44 (FIG. 8).

Comparing the substrate diagram of FIG. 7 with the corresponding substrate diagram of application Ser. No. 740,409, it will be readily seen that the interface chip of this invention replaces eight separate integrated circuit chips IC3-IC10. This reduces the number of wire bonds required from 158 to 104 (a reduction of approximately 34%).

By way of example only, but not of limitation, the external resistor and capacitors may have the following values:

$R_1 = 20M\Omega$ $R_4 = 100K\Omega$ $R_5 = 100K\Omega$ $R_6 = 100K\Omega$ $R_7 = 100K\Omega$ $R_8 = 330K\Omega$ $R_9 = 39K\Omega$ $C_2 = 33pf$ $C_3 = 33pf$ $C_4 = 1\mu f$ $C_5 = 100pf$ While a specific embodiment of the invention has been shown and described in detail, it will be understood that the invention may be modified without departing from the spirit of the inventive principles as set forth in the hereafter appended claims.

What is claimed is:

1. A wristwatch having a case in which are mounted a clock chip, a calculator chip, a plurality of electro-optical display stations, a manually operated time display mode switch connected to said clock chip for coupling said clock chip to said display stations, a plurality of manually operated keyboard switches, including a calculator display mode switch, mounted in said case and connected to said calculator chip for alternatively coupling said calculator chip to said display stations, an interface chip having inputs connected to outputs of the clock and calculator chips and outputs connected to the display stations, said interface chip containing substantially all of the circuits necessary to multiplex the clock and calculator outputs to display the desired output as commanded by the time display mode and calculator mode switches, and an inertia switch in said case and connected to said interface chip, said interface chip having means for detecting a predetermined pattern of movement of said inertia switch and for generating a time demand signal upon detection of said predetermined pattern of movement to select the watch display mode, whereby time is displayed at said display stations.

2. The wristwatch according to claim 1, said interface chip having: calculator power control means for energizing said calculator chip when the calculator mode is selected by said calculator mode display switch and means for overriding the calculator mode and restoring the time display mode upon activation of the time display mode switch, said override means deenergizing said calculator chip when the time display mode is selected by said time display mode switch.

3. The wristwatch according to claim 2, said interface chip having inertia switch inhibit means coupled between said power control means and said inertia switch movement detecting means for inhibiting the operation of said detecting and time demand signal generated means during the calculator mode.

4. The wristwatch according to claim 3, said interface chip having means for providing a time setting signal to said clock chip, and means coupled to said power control means for inhibiting said setting signal during the calculator display mode and permitting transmission of said setting signal to said clock chip at other times.

5. The wristwatch according to claim 4, said interface chip having a plurality of watch segment display inputs coupled to watch segment display outputs of said watch chip; a plurality of calculator segment display inputs coupled to calculator segment display outputs of said calculator chip; a plurality of segment display outputs coupled to segment display inputs of said display stations; said interface chip having means for selectively passing watch segment display information from said watch chip and calculator segment display information from said calculator chip to said display stations under the control of said time display and calculator display mode switches, respectively.

6. The wristwatch according to claim 5, said interface chip having a plurality of watch digit display inputs coupled to watch digit display outputs of said clock chip; a plurality of calculator digit display inputs coupled to calculator digit display outputs of said calculator chip; a plurality of digit display outputs coupled to digit display inputs of said display stations; and means for selectively passing watch digit display information from said watch chip and calculator digit display information from said calculator chip to said display stations under the control of said time display and calculator display mode switches, respectively.

7. The wristwatch according to claim 6, said interface chip having: segment driver devices for generating sufficient power to drive the segments of said display stations, digit driver devices for generating sufficient power to drive the digits of said display stations, means coupled to said segment drivers for selectively gating watch segment information and calculator segment information to said segment drivers under the control of said time display and calculator display mode switches, and means coupled to said digit drivers for selectively gating watch digit information and calculator digit information to said digit drivers under the control of said time display and calculator display mode switches, respectively.

8. The wristwatch according to claim 7, wherein said calculator power control means, inertia switch inhibit means, override means, setting signal inhibit means, segment drivers, digit drivers, and gating means comprise CMOS devices.

9. The wristwatch according to claim 7, wherein said calculator power control means, inertia switch inhibit means, override means, setting signal inhibit means, segment drivers, digit drivers, and gating means comprises I²L devices.

* * * * *